United States Patent
Vaughn et al.

(10) Patent No.: US 11,042,950 B2
(45) Date of Patent: Jun. 22, 2021

(54) AUTOMATED CONTENT TRANSMISSION SYSTEM

(71) Applicant: Vaughn Realty Ventures LLC, Great Falls, VA (US)

(72) Inventors: Bradley Moser Vaughn, Burlingame, CA (US); William J. Raduchel, Palo Alto, CA (US)

(73) Assignee: Vaughn Realty Ventures LLC, Great Falls, VA (US)

( * ) Notice: Subject to any disclaimer, the term of this patent is extended or adjusted under 35 U.S.C. 154(b) by 0 days.

(21) Appl. No.: 15/696,236

(22) Filed: Sep. 6, 2017

(65) Prior Publication Data

US 2018/0068403 A1 Mar. 8, 2018

Related U.S. Application Data

(60) Provisional application No. 62/384,024, filed on Sep. 6, 2016.

(51) Int. Cl.
G06Q 50/16 (2012.01)
G06Q 10/00 (2012.01)

(52) U.S. Cl.
CPC .......... *G06Q 50/163* (2013.01); *G06Q 10/20* (2013.01)

(58) Field of Classification Search
CPC .................................................. G06Q 50/163
See application file for complete search history.

(56) References Cited

U.S. PATENT DOCUMENTS

| 7,092,888 | B1* | 8/2006 | McCarthy | G10L 15/063 379/88.01 |
|---|---|---|---|---|
| 2006/0036991 | A1* | 2/2006 | Biazetti | G06F 9/453 717/104 |
| 2009/0077062 | A1* | 3/2009 | Spivack | G06Q 30/02 |
| 2011/0106660 | A1* | 5/2011 | Ajjarapu | G06Q 30/06 705/26.41 |
| 2012/0191629 | A1* | 7/2012 | Shae | G06F 17/30637 706/11 |
| 2013/0262082 | A1* | 10/2013 | McKeeman | G06F 17/27 704/9 |
| 2014/0171034 | A1* | 6/2014 | Aleksin | H04M 1/72403 455/414.1 |

(Continued)

OTHER PUBLICATIONS

Nguyen et al, "Improving Topic Models with Latent Feature Word Representations"; 16 pages (Year: 2015).*

*Primary Examiner* — Kira Nguyen
(74) *Attorney, Agent, or Firm* — Fish & Richardson P.C.

(57) ABSTRACT

In some implementations, techniques are described for automatically providing service/maintenance-related content to a resident of a property in response to receiving a service request from the resident. Data indicating a service request submitted by a computing device of a user is initially obtained. The service request identifies a property associated with the computing device. Contents of the service request are processed. A service topics indicated by the service request and a request type of the service request are identified based on processing the contents of the service request. Content is selected among a collection of content for the property based on the identified service topic and the identified request type. A communication that includes the communications is provided for output on the computing device.

19 Claims, 8 Drawing Sheets

(56) References Cited

U.S. PATENT DOCUMENTS

| | | | |
|---|---|---|---|
| 2014/0214818 A1* | 7/2014 | Du | G06F 17/30702 |
| | | | 707/723 |
| 2014/0270146 A1* | 9/2014 | Riahi | G06N 99/005 |
| | | | 379/265.13 |
| 2014/0333412 A1* | 11/2014 | Lewis | G07C 9/00031 |
| | | | 340/5.2 |
| 2015/0287152 A1* | 10/2015 | Oakes | G06Q 10/20 |
| | | | 705/26.4 |
| 2016/0117646 A1* | 4/2016 | Lerick | G06Q 10/1095 |
| | | | 705/7.21 |
| 2016/0117785 A1* | 4/2016 | Lerick | G06Q 10/1095 |
| | | | 705/305 |

* cited by examiner

AUTOMATED CONTENT TRANSMISSION SYSTEM

CROSS-REFERENCE TO RELATED APPLICATION

This application claims the benefit of U.S. Provisional Application No. 62/384,024, filed Sep. 6, 2016, which is incorporated by reference in its entirety.

FIELD

The present specification generally relates to property content distribution systems, and more specifically to, content distributions systems for property management software (PMS).

BACKGROUND

In the hospitality industry, a property management system (PMS) is a comprehensive software application that is used to cover some basic objectives such as coordinating the operational functions of front office, sales and planning etc.

SUMMARY

While modern high-end properties often utilize sophisticated PMS to coordinate multiple processes related to property leasing, service/maintenance, and payment processing, such software is often inapplicable for properties that lack the resources and/or infrastructure to effectively implement. In addition, PMS systems are often used reactively to address problems with a property building or the individual units within the property building (e.g., creation of service tickets) rather than proactively to provide residents with user-specific content or information to reduce potential maintenance costs.

In addition, a large portion of service requests received by some PMS systems often relate to routine procedures that can be performed by a resident directly, or are based on a mistaken issue by the resident that an issue actually exists. Responses to these service requests by maintenance personnel often impose extraneous costs onto property administrators, and/or increase a time frame for response if the service request is transmitted during off-peak time periods (e.g., during the night, weekends, etc.).

Accordingly, one innovative aspect of the subject matter described throughout this specification relates to a system architecture that enables a property administrator to obtain service/maintenance-related content to automatically provide to a resident in response to receiving a service request. For instance, a third party content provider may initially distribute property-specific content to a property administrator based on property information, tenant, and/or leasing information associated with the corresponding property. The content can then be aggregated and distributed to residents using various exchange mediums. In this regard, the distributed content may specifically be tailored to the service requirements of the property in order to maximize their potential use by residents. In some instance, rental data collected by the property administrator (e.g., prior service records, tenant complaints, etc.) may be used by the content provider to determine the applicable content to distribute to the property administrator.

In one general aspect, a method performed by one or more computers can include the operations of: obtaining data indicating a service request submitted by a computing device of a user, the service request identifying a property associated with the computing device; processing contents of the service request; identifying, based on processing the contents of the service request, (i) a service topic indicated by the service request, and (ii) a request type of the service request; selecting content from among a collection of content for the property based on the identified service topic and the identified request type; and providing, for output to the computing device, a communication that includes the selected content.

One or more implementations can include the following optional features. In some implementations, the service request indicates maintenance for a particular application located within the property, and the content includes a tutorial video for performing the maintenance on the particular device.

In some implementations, the collection of content comprises content that is predetermined to be associated with service requests previously received for the property.

In some implementations, the collection of content includes content that is predetermined to be associated with service requests previously received for one or more properties of the same property type as the property.

In some implementations, processing the contents of the service request includes: identifying terms included within the service request; determining that the identified terms includes one or more terms corresponding to the service topic of the service request; and determining that the identified terms includes one or terms that identify the request type of the service request.

In some implementations, the one or more terms corresponding to the service topic of the service request identifies a particular appliance within the property; and the one or more terms identifying the request type of the service request identify a type of maintenance to be performed on the articular appliance.

In some implementations, data indicating the service request is received through property management software that runs on a processing device for a property administrator of the property; and the selected content is selected from among a collection of content stored within the property management software.

In some implementations, the communication that includes the selected content is a text message that is provided to the computing device; and the text message includes a hyperlink to a web location of the content.

In some implementations, data indicating the service request is received as a text message on a processing device of a property administrator of the property; and the communication that includes the selected content is a text message that is provided to the computing device.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
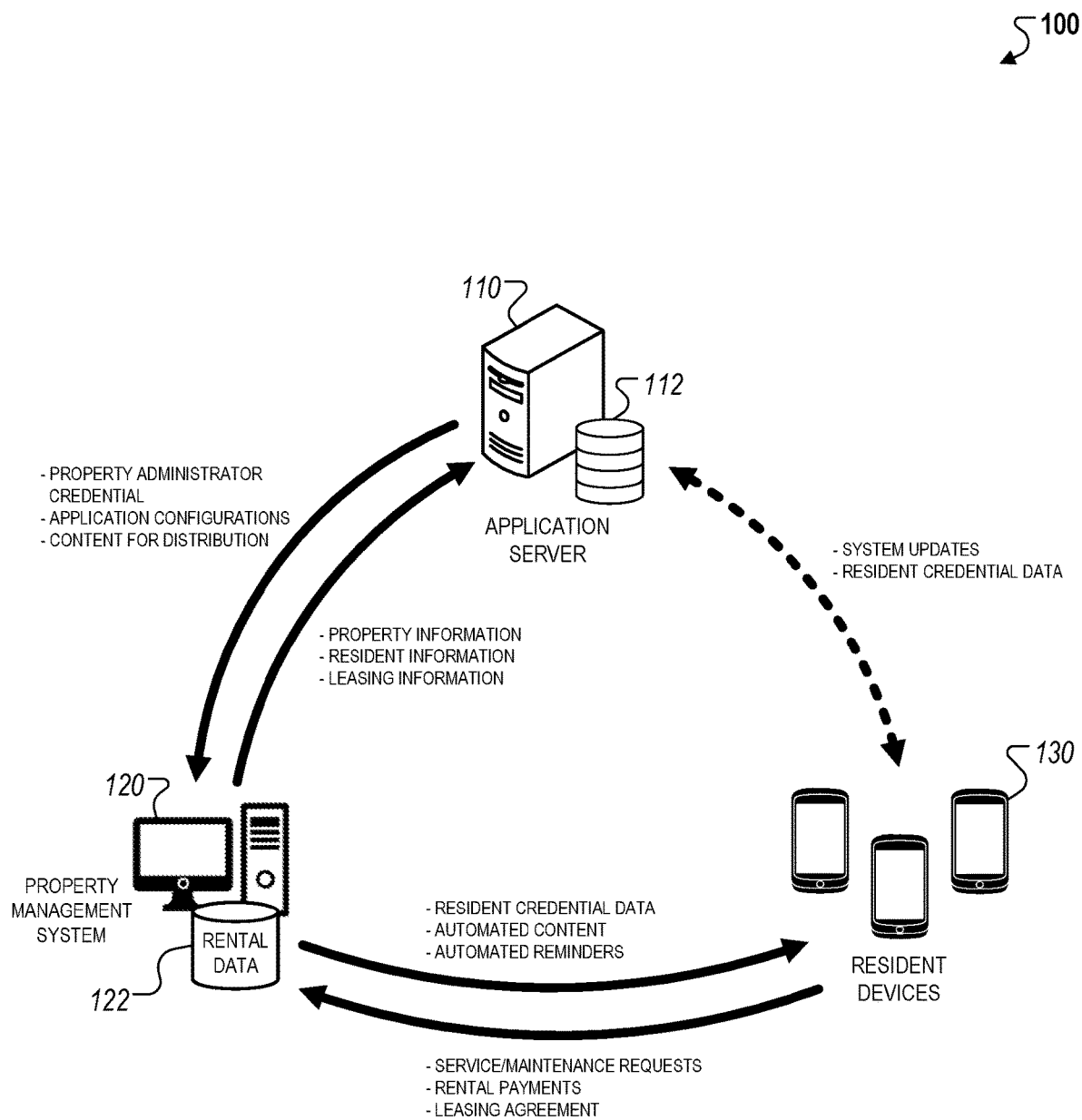
FIG. 1 is an exemplary property management system for automatically transmitting content to property administrators.

While modern high-end properties often utilize sophisticated PMS to coordinate multiple processes related to property leasing, service/maintenance, and payment processing, such software is often inapplicable for properties that lack the resources and/or infrastructure to effectively implement. In addition, PMS systems are often used reactively to address problems with a property building or the individual units within the property building (e.g., creation of service tickets) rather than proactively to provide residents with user-specific content or information to reduce potential maintenance costs.

In addition, a large portion of service requests received by some PMS systems often relate to routine procedures that can be performed by a resident directly, or are based on a mistaken issue by the resident that an issue actually exists. Responses to these service requests by maintenance personnel often impose extraneous costs onto property administrators, and/or increase a time frame for response if the service request is transmitted during off-peak time periods (e.g., during the night, weekends, etc.).

Accordingly, one innovative aspect of the subject matter described throughout this specification relates to a system architecture that enables a property administrator to obtain service/maintenance-related content to automatically provide to a resident in response to receiving a service request. For instance, a third party content provider may initially distribute property-specific content to a property administrator based on property information, tenant, and/or leasing information associated with the corresponding property. The content can then be aggregated and distributed to residents using various exchange mediums. In this regard, the distributed content may specifically be tailored to the service requirements of the property in order to maximize their potential use by residents. In some instance, rental data collected by the property administrator (e.g., prior service records, tenant complaints, etc.) may be used by the content provider to determine the applicable content to distribute to the property administrator.

In some implementations, a system enables a content provider to transmit a set of associated content to a property management system of a property administrator. The associated content may include content that is predetermined to be useful for residents of the corresponding property. For example, the associated content may be determined to be relevant for the property based on property or resident attributes included within rental data stored on the property management system (e.g., property information, resident information, leasing information). The associated content may include multimedia that is automatically provided to residents in response to a submitted service request (in order to enable residents to address simple issues without maintenance staff), reoccurring reminders to provide payments and/or perform actions required by the property administrator, and/or other data that is useful for residents.

Credential data for the various devices associated with the system are generated in order to protect sensitive information such as, for example, resident information, leasing information, or other property-specific information that is reserved from the public. As described below with respect to FIG. 2, a user credential may be associated with both a property administrator device, as well as one or more resident devices associated with each rental unit in order to ensure that data transmissions over the network 105 is secure and protected. The credential data is distinct from a traditional username/password combination in that it is associated with an employment agreement (in the case of a property administrator) or a leasing agreement (in the case of a resident).

As described herein, a "property administrator" refers to an individual or an entity that controls access to a rental property. For example, in some instances, a property administrator may be a property owner that retains property title to the property to be rented. In other instances, the property administrator may be an authorized agent of the property owner that manages and rents the property on behalf of the property owner. The property administrator specifies a set of access conditions that are associated with the rental of a property. For example, the property administrator may specify the cost of rental, time periods of availability, or services that are offered along with the property rental.

A "user" (or "prospective tenant" or "tenant") refers to an individual that requests to rent a property that is made available by the property administrator. The user can submit a rental requests through various mediums such as sending a direct email to the property administrator, placing a request through a property rental webpage, and/or through an application that provides property rental services.

A "content" refers to any form of digital data such as media that is stored on either digital or analog storage in specific formats. For instance, digital content may include information that is digitally broadcast, streamed, or contained in computer-readable files. Examples of content described throughout may include video, software, audio images. The content may be free to view or experience as available on the Internet, or paid for by a consumer to a content provide.

A "property" refers to a building or a dwelling a portion of which, or a whole part of, is made available for rent by a property administrator. Examples of property may include houses, apartment building complexes, or other fixtures that may be subdivided. A property can also be either residential or commercial as described throughout.

FIG. 1 is an exemplary property management system 100 for automatically transmitting content to property administrators of a particular property. The system 100 generally includes an application server 110, a property management system 120, and resident devices 130 that exchange communications over a network 105. The application server 112 may further include a database 112 for storing automated content for a variety of properties, and the property management system 120 may further include a database 122 that stores rental data for a particular property.

In more detail, the network 105 can be configured to enable exchange of electronic communications between devices connected to the network 105. For example, the network 105 may be configured to enable exchange of electronic communications between the application server 110, the property management system 120, and the resident devices 130.

The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway.

The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The application server 110 may be an electronic computing device (e.g., a remote server) that is monitored and operated by an organization or institution that generates a variety of content that is applicable for property administrators to distribute to occupants. For instance, the organization may be a content provider that generates content related to preventative property maintenance. The content may include how-to tutorials, videos, or blogposts for occupants to receive from the property management system 120. In other instances, the organization may be a content aggregator that obtains applicable content from a variety of content sources and then re-packages the content and distributes to various property management systems 120 of different properties.

The application server 110 may further coordinate and administer the backend processes that are involved in automatically transmitting content to the property management system 120. For instance, the application server 110 may initiate processes to enroll property administrators of a particular property, maintain reoccurring content transmission schemes over reoccurring periods of time, or operate security protocols to protect resident information of occupants of properties.

The property management system 120 may be a network of electronic computing devices that includes devices of property administrators of a particular property. For instance, the property management system 120 may include devices used by leasing agents, building security personnel, building maintenance personnel, concierge, among other types of individuals that are associated with property management staff.

The property management system 120 also includes the database 122 for storing rental data associated with a particular property. For instance, the rental data may include property information such as address and/or landlord information, size of property, amenities/utilities offered to occupants, number of apartment units, property insurance information, current management company, appliances, among other types of pertinent property information. The rental data may also include occupant information such as demographic and contact information associated with each occupant that has rented a unit within the property associated with the property management system 120. In some implementations, the resident information may be de-identified and/or encrypted with an applicable security feature in order to protect the privacy of the occupants. The rental data further includes leasing information that specifies periods of occupancy of particular rental units, expected and/or anticipated departures associated with when occupants are expected to vacate, and/or any standard policies of the property administrators that are included in each rental agreement for a unit within the property.

The resident devices 130 may be personal electronic computing devices of occupants within units of the particular property associated with the property management system 120. For instance, the resident devices 130 may be one or more of a smartphone, a tablet computing device, a laptop computing device, a desktop computing device, a smart wearable device, and/or any device capable of operating an application.

The resident devices 130 exchange communications with the property management system 120 to transmit requests related to property maintenance or service, and/or receive content that is predetermined to be responsive to the submitted to the requests. For instance, described more particularly with respect to FIGS. 4 and 5, in some instances, the property management system 120 may automatically process a received request from one of the resident devices 130, identify content from among the content received from the application server 110 that is most applicable to the received request, and automatically transmit the identified content to the particular resident device.

The resident device 130 may include an application that enables an occupant to receive property-related updates from the property management system 120, automated payment reminders for reoccurring payments (e.g., monthly rent payments, utility payments, etc.), provide continuous and ongoing analyses related to property management, emergency notices associated with either a particular unit or the entire property, and/or content that is determined to be responsive to a request transmitted by the resident.

The application on the resident device 130 may be configured to operate based on specifications provided by the property administrators of the property management system 120. Property administrators may enable or disable certain features provided for use on the application based on the rental data stored in the database 122. For example, property administrators may customize particular features based on the attributes of the property, or customize particular features for each resident based on the resident information or the leasing information associated with each resident. In this regard, the features of the application on the resident device 130 may be administered by the property management system 120 to the resident devices 130 such that the application provides unit-specific features that are uniquely applicable for the corresponding residents of a particular unit.

Figure 2:
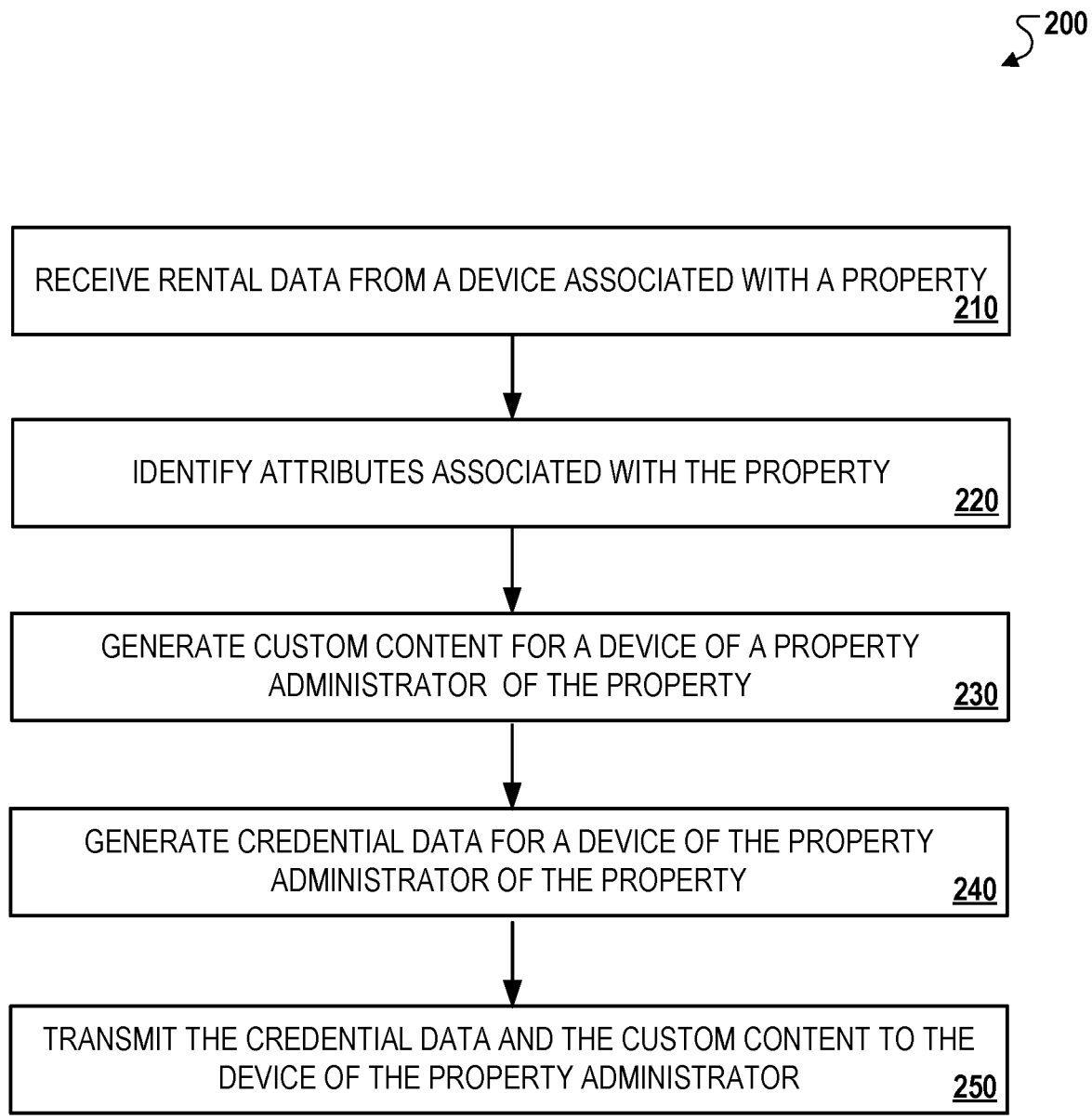
FIG. 2 illustrates an exemplary process for generating a credential for a property administrator of property management system.

FIG. 2 illustrates an example of a process 200 for generating a credential for a property administrator of property management system. Briefly, the process 200 may include receiving rental data from a device associated with a property (210), identifying attributes associated with the property (220), generating custom content for the property based on the identified attributes (230), generating credential data for a device of a property administrator of the property (240), and transmitting the credential data and the custom content to the device of the property administrator of the property (250).

In more detail, the process 200 may include receiving rental data from a device of a property (210). For instance, the application server 110 may receive rental data 122 from the property management system 120. The rental data 122 may include, for example, a request to enroll into a program that provides the property management system 120 with a set of content to distribute to residents of the property where the property management system 120 is located. In addition, the request may also include property-specific information such as property attributes, resident information, or leasing information.

The process 200 may include identifying attributes associated with the property (220). For instance, after receiving the rental data from the property management system 120, the application server 110 may categorize the property based on the size of the property (e.g., number of units, number of occupants, percentage occupancy, etc.), demographic information of the residents (e.g., age distribution, average household size), or other attributes that indicate likely preferences associated with the residents. The attributes may further reflect determinations by the application server 110 relating to the property where the property is located, which are then used to determine the applicable content to distribute.

The process 200 may include generating custom content for the property based on the identified attributes (230). For instance, the application server 110 may identify content is likely to be applicable to a particular portion of the resident population at a property where the property management system 120 is located. For example, if the rental data indicates that a resident population has a large portion of elderly individuals, then the generated custom content may include easily accessible tutorial videos that instruct residents with limited experience to operate common household appliances. In another example, if the rental data indicates that certain appliances are problematic within the property (e.g., a higher prevalence of service tickets associated with a particular appliance), then the generated custom content may include a greater portion of content that is associated with the particular appliance.

The generated content may further include variety of different types of content that are determined to address predicted processes associated with the property. For example, the generated content may include different types of multimedia (e.g., video, audio, pictures, etc.) related to preventative maintenance, automated responses to be provided to certain types of service requests, among other types of content.

The process 200 may include generating credential data for a device of a property administrator of the property (240). For instance, the application server 110 may generate a user credential for a property administrator associated with a property management system. The user credential can be used to verify the identity of a property administrator in order to protect the privacy of privileged information included within the rental data 122. For example, the credential data may include an employee ID associated with the property administrator, employment information for the property administrator, and other types of employment information.

The process 200 may include transmitting the credential data and the custom content to the device of the property administrator of the property (250). For instance, the application server 110 may transmit the generated credential data and the custom content to a device included within the property management system 120 of the property.

Figure 3:
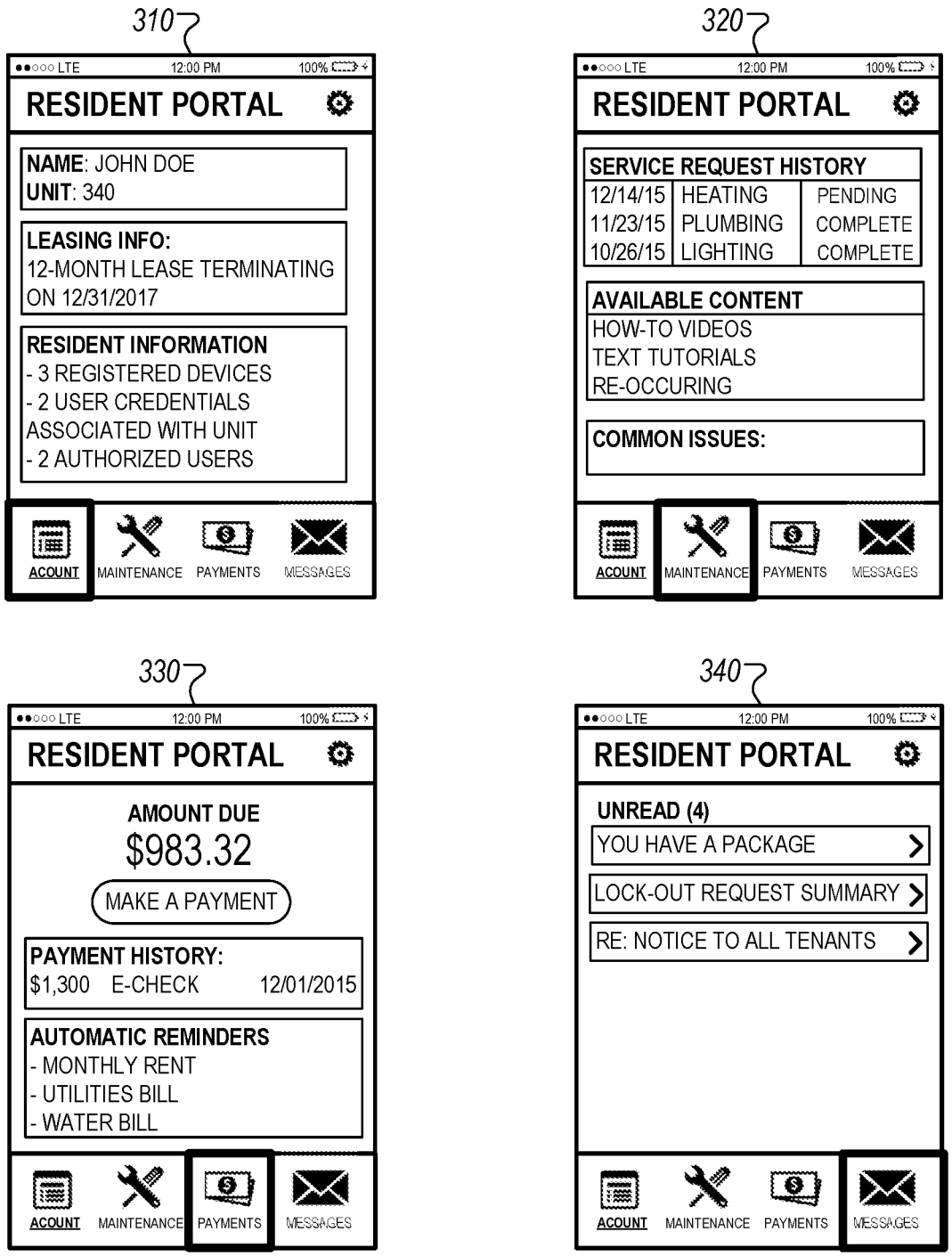
FIG. 3 illustrates examples of user interfaces for a property management portal.

FIG. 3 illustrates examples of user interfaces 310-340 for a property management portal of an application. The property management portal may be used by a property administrator to coordinate various processes related to apartment rental within a property. Briefly, the interface 310 depicts an interface for viewing and managing account information associated with a tenant, the interface 320 depicts an interface for viewing previously submitted service requests and/or other related content associated with the service requests, the interface 330 depicts an interface for viewing payment information and/or transmitting automatic payment reminders, and the interface 340 depicts a messaging platform to transmit messages to one or more residents.

Referring initially to interface 310, a property administrator may use the property management portal to view both account information for the entire property and/or resident-specific information. In the example depicted in FIG. 3, the interface 310 displays resident information, leasing information, and/or other account information. For instance, the interface 310 indicates that three devices have been associated with the application, which correspond to two user credentials that have been distributed and associated with the unit 340. In this example, the two user credentials may be distributed to two individuals that are identified on a leasing agreement for the unit 340 (e.g., two married adults) and a dependent resident that is a child that lacks the privileges of an authorized user. In this regard, the system 100 is capable of tracking information associated with individual devices associated with a particular rental unit in order to provide a different set of privileges based on the status associated with a user (e.g., authorized resident that is a signatory of the lease agreement, long-term guest not a signatory, short-term guest, etc.).

Referring now to interface 320, a property administrator may be able to view a service request history that indicates a date for the request, a service category designed to the request, and a present status associated with the service request. In addition, the property administrator may view service request histories for the entire building (e.g., based on different categories of requests submitted), or service requests for a particular rental unit. The interface 320 also provides a list of available content that is determined to be associated with the specific types of service requests that are submitted by residents.

In the example depicted in FIG. 3, a how-to video may be associated with a simple service request that is capable of being addressed by a resident in the absence of or unavailability of maintenance personnel (e.g., a clogged toilet, turning off an emergency alarm, resetting an electrical fuse, etc.). Another example may include a text tutorial that provides a resident with a step-by-step guide on how to address a particular issue if the user wishes to not wait for maintenance staff. In yet another example, the content can also include re-occurring updates that are provided to residents informing them to regularly perform preventative maintenance and/or identify potential issues that may become more significant in the future. Examples of these types of service requests can include checking the heating/ cooling system, checking and/or replacing components that may be likely to be deteriorating, etc.

Referring now to interface 330, a property administrator may view and manage payments submitted by residents. For instance, the interface 330 may show payment histories that indicate dates of payment and payment techniques. The interface 330 also enables a property administrator to configure automatic reminders to be sent to residents of the property. In the examples depicted in FIG. 3, the interface 330 specifies different types of reminders for monthly rent payments, reoccurring utility bills, and water bill. In addition, the property administrator may specify different notification techniques for different types of reminders. For example, automatic payment reminders for rent may be configured to be sent as SMS messages sent directly to all authorized user devices associated with a property whereas automatic payment reminders for utility bills may be configured to be sent only as emails.

Referring now to interface 340, a property administrator may use a messaging interface to exchange communications with residents using the application. The interface 340 may show received messages from residents, indicate messages that have been read and/or provide options to provide automated response messages. For instance, as described more particularly with respect to FIGS. 4 and 5, automatic responses may include content that is predetermined to be associated and/or responsive to a particular request transmitted by a resident. In such an instance, the property administrator may preconfigured a set of automated response messages on the interface 340 that are then transmitted automatically when the system 100 identifies and determines that a particular request relates to set of messages that are identified as triggers for automated message transmission. As an example, the property administrator may specify an automated message that provides a resident with step-by-step written tutorials for each appliances included in a property in response to receiving any messages that include appliance inquiries.

Figure 4:
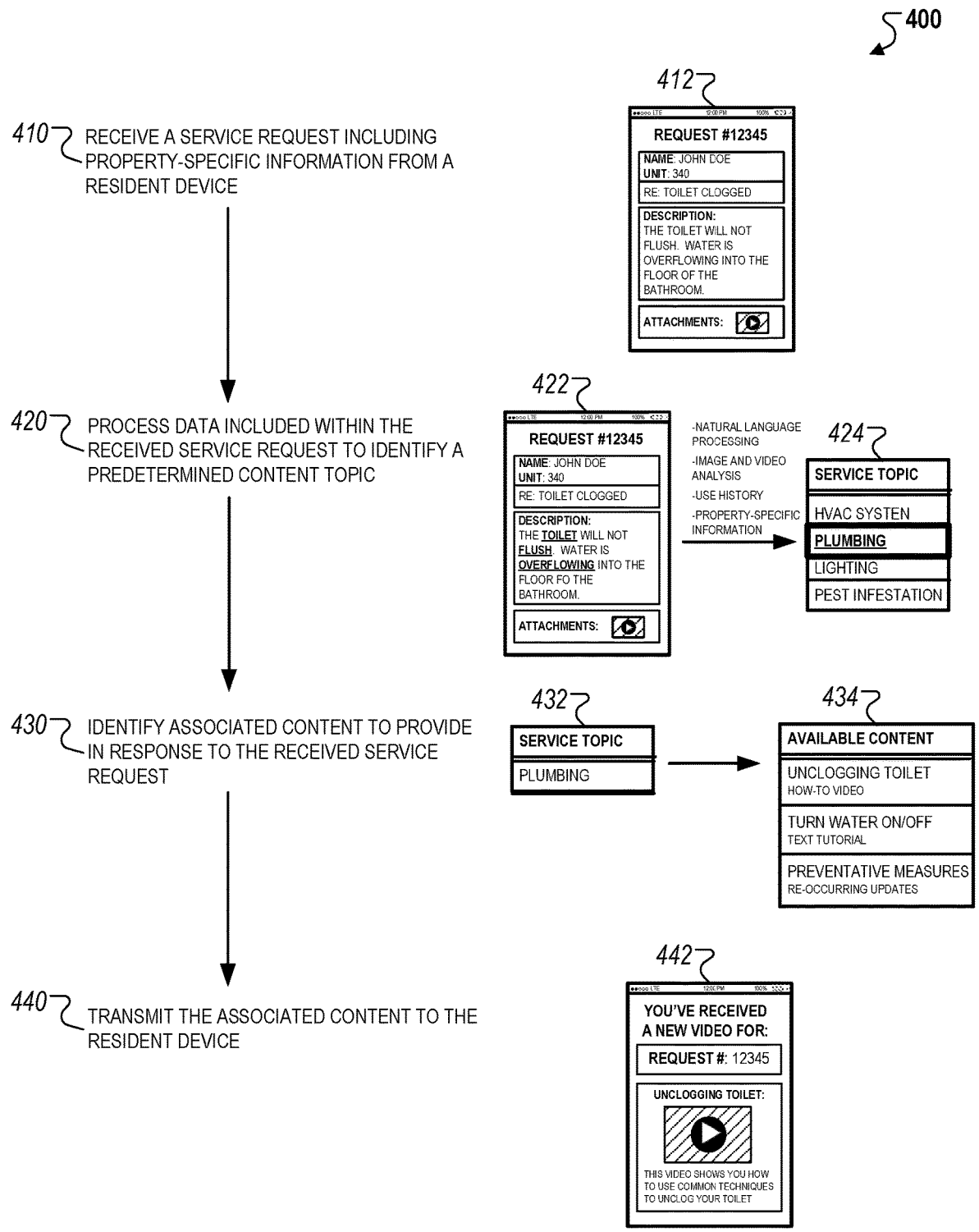
FIG. 4 illustrates an example of a process for transmitting automated content to a device of a resident.

FIG. 4 illustrates an example of a process 400 for transmitting automated content to a device of a resident. Briefly, the process 400 may include receiving a service request including property-specific information from a resident device (410), processing data included within the received service request to identify a predetermine content topic (420), identifying associated content to provide in response to the received service request (430), and automatically transmitting the associated content to the resident device (440).

In general, FIG. 4 provides an exemplary use case of the system 100 in which a resident may automatically receive content in response to a submitted service request. The content may be selected from a list of available content for a property that is distributed to the property management system 120 from a application server 110. As described in more detail below, the content is determined by the property management system 120 to be associated and/or responsive to the service topic associated with the submitted service request. In this regard, the system 100 enables the automatic identification and selection of content to provide real-time assistance to a resident when maintenance personnel are unavailable. This can potentially be used to assist residents to perform tasks that address the service issue and/or provide information to perform or prevent further action to limit any potential property damages until maintenance personnel become available to assist the user.

In more detail, the process 400 may include receiving a service request including property-specific information from a resident device (410). For instance, the property management system 120 may receive a service request 412 from the resident device 130 that includes information for a service issue related to a rental unit within the property associated with the property management system 120. Such information may include a brief description of the issue and/or attachments that include content associated with the service request. As an example, a user may capture a picture or a video associated with the image and include the captured content into the service request 412. In the example depicted in the figure, a resident sends a service request related to a clogged toilet, along with a picture of the toilet within the property unit.

The process 400 may include processing data included within the received service request to identify a predetermine content topic (420). For instance, the property management system 120 may use various processing techniques to identify a predetermined content topic and/or service category associated with the received service request 412. In the example depicted in FIG. 4, the property management system 120 may use natural language processing techniques to identify terms included within the description of the service issue and identify corresponding service topics 422 associated with the identified terms. For example, the property management system identifies the terms "toilet," "flush," and "overflowing," each of which are commonly and collectively associated with plumbing issues within a rental unit. In this example, the property management system may identify plumbing as the predetermined service topic that is implicated with the received service request 412.

In some implementations, the property management system 120 may use historical data processing and analysis techniques to identify a predetermined service topic associated with the received service request 412. For instance, in response to receiving the service request 412, the property management system 120 may obtain historical user data that includes, for example, prior service requests submitted by the resident associated with the received service request 412, property-specific information (e.g., manufacturer information associated with the impacted appliance, list of other appliances installed within the property), among other types of resident-specific and/or property-specific information. The property management system 120 may use statistical techniques to identify trends within the historical data that indicates an increased likelihood for the resident to provide a particular type of request. For example, if a particular resident submits a significantly high number of service requests related to the HVAC system of a rental unit, then the property management system 120 may augment the processing techniques used to identify a predetermined service topic 422 such that the likelihood of selecting a predetermined service topic from among the list of topics 422 is increased for previously identified topics.

The process 400 may include identifying associated content to provide in response to the received service request (430). For instance, after identifying and selecting a predetermined topic 432 (e.g., plumbing in the figure) associated with the received service request 412, the property management system 120 may then identify available content 434 that was previously distributed from the application server 434. As described herein within respect to FIG. 1, the available content 434 may include different types of digital content that provide residents with useful information to obtain information related to a service request in the absence of maintenance staff being available to resolve the service request. Examples of available content may include how-to videos, text tutorials and/or reoccurring media content that is distributed to assist a resident perform preventative measures.

In the example depicted in the figure, the processing techniques performed within step 420 may be combined with the selection of the predetermined service topic 432 in order to filter a list of available content 434 that is associated with the predetermined service topic 432, and select a particular piece of available content from among the list of available content 434 that is most likely to be responsive to the service request 412. For example, a how-to video related to unclogging toilet may be selected by the property management system 120 based on the similarity of terms included within the service request (e.g., "toilet," "clogging") and a set of keywords associated with the keywords. In this regard, the property management system 120 capable of automatically identifying, filtering, and selecting a particular piece of content that is likely to be responsive to the resident's submitted service request.

The process 400 may include automatically transmitting the associated content to the resident device (440). For instance, an interface 442 may be automatically presented on the user device 130 that submitted the service request 412. As depicted in the figure, the interface 442 may identify include identifying information associated with the submitted service request (e.g., request ID) and the content selected by the property management system 120 in response to receiving the submitted service request 412.

Figure 5:
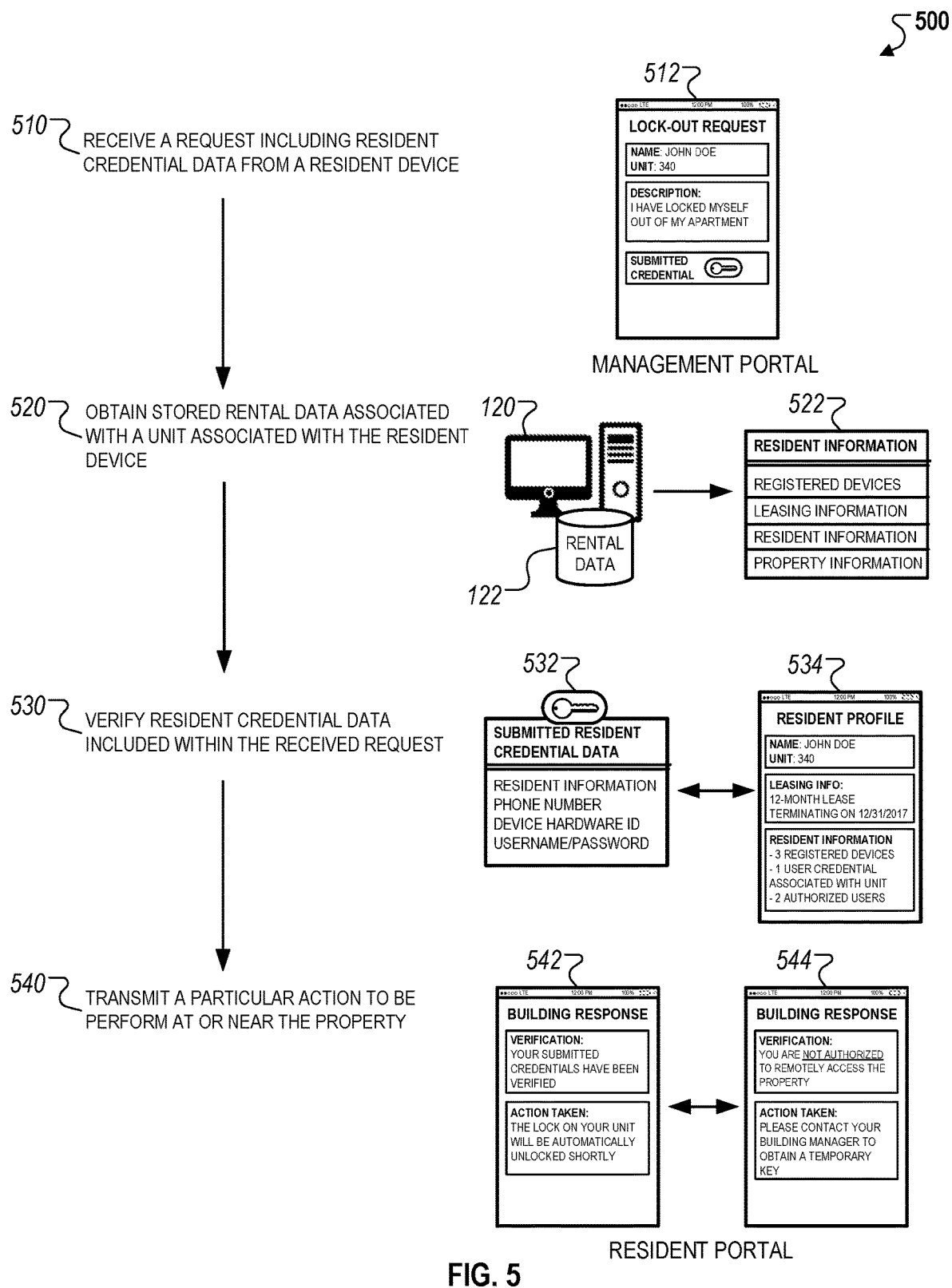
FIG. 5 illustrates an example of a process for verifying credential data of a resident to perform an automated unlock function.

FIG. 5 illustrates an example of a process 500 for verifying credential data associated with a resident to perform an automated unlock function. Briefly, the process 500 may include receiving a request including resident credential data from a resident device (510), obtaining stored rental data associated with a unit associated with the resident device (520), verifying the resident credential data included within the received request (530), and transmitting a particular action to be performed at or near the property (540).

In general, FIG. 5 provides an exemplary implementation of the system 100 in which a property management system 120 provides automated access to an authorized resident in response to a lock-out request. In this example, user credential data generated for the resident, as described previously with respect to FIG. 2, may be used to determine if the resident submitting the lock-out request is an authorized resident that is associated with the rental unit. Generated credential data of a resident device 130 may therefore be used to provide specific access features to residents while limiting potential security concerns.

In more detail, the process 500 may include receiving a request including resident credential data from a resident device (510). For instance, the property management system 120 may receive a lock-out request 512 that includes resident information, a event description, and a submitted user credential associated with the resident device 130. As described previously with respect to FIG. 2, the credential data may initially be generated for the resident by associating device information and leasing information for the resident's rental unit. In this regard, the credential data for a resident specifies information for the user device 130 as well as associated with a physical location address indicated by the resident's leasing agreement.

The process 500 may include obtaining stored rental data associated with a unit associated with the resident device (520). For instance, the property management system 120 may obtain rental data 122 stored on a database associated with a property where the property management system 120 is located. The obtained rental data 522 may specify registered devices, leasing information, resident information, and property information as described previously with respect to FIGS. 1-2. The rental data 122 may further include a stored generated credential data that is used as a reference credential to compare against the submitted user credential within the lock-out request 512 during a credential verification operation.

The process 500 may include verifying the resident credential data included within the received request (530). For instance, the property management system 120 my compare the submitted credential data 532 included in the received lock-out request 512 against a stored resident profile 534 that specifies leasing information and resident information. The submitted credential data 532 may include, for example, resident-specific information (e.g., legal name, financial information, etc.), phone number, a hardware identifier associated with the device that sends the lock-out request 512, or a dedicated username/password combination submission.

In some implementations, the property management system 120 may store multiple authorized devices associated with a single apartment rental unit. For instance, each authorized device may be associated with a different residents of a unit, and include a set of privileges associated with each resident device. In this regard, the system 100 provides a mean to create different levels of user access levels corresponding to different types of residents (e.g., residents identified on the lease agreement, under-aged dependents, long-term guests, short-term guests, etc.). In such implementations, automatic lock-out may be a feature that is restricted to authorized users. Thus, during the verification operation, if the property management system 120 determines that the submitted credential includes insufficient access privileges, the property management system 120 may prevent the resident device from automatically unlocking the rental unit.

The process 500 may include transmitting a particular action to be performed at or near the property (540). For instance, after performing a verification operation on the submitted credential data 532 within the received lock-out request 512, the management property system 120 may transmit a signal to perform an action at or near the corresponding property specified in the lock-out request 512. In some examples, the action may include transmitting an instruction to automatically unlock an electronic lock on the front door of the property, as depicted in the interface 542 on the resident portal, if the submitted user credential has been verified. Alternatively, in other examples, the action may instead include transmitting a notification to the resident device 130 informing the user to contact a building manager, as depicted in the interface 544 on the resident portal, if the submitted user credential has not been verified. In this regard, the verification of the submitted user credential 532 may be used to differentially and selectively provide access to a property only to authorized users.

Figure 6:
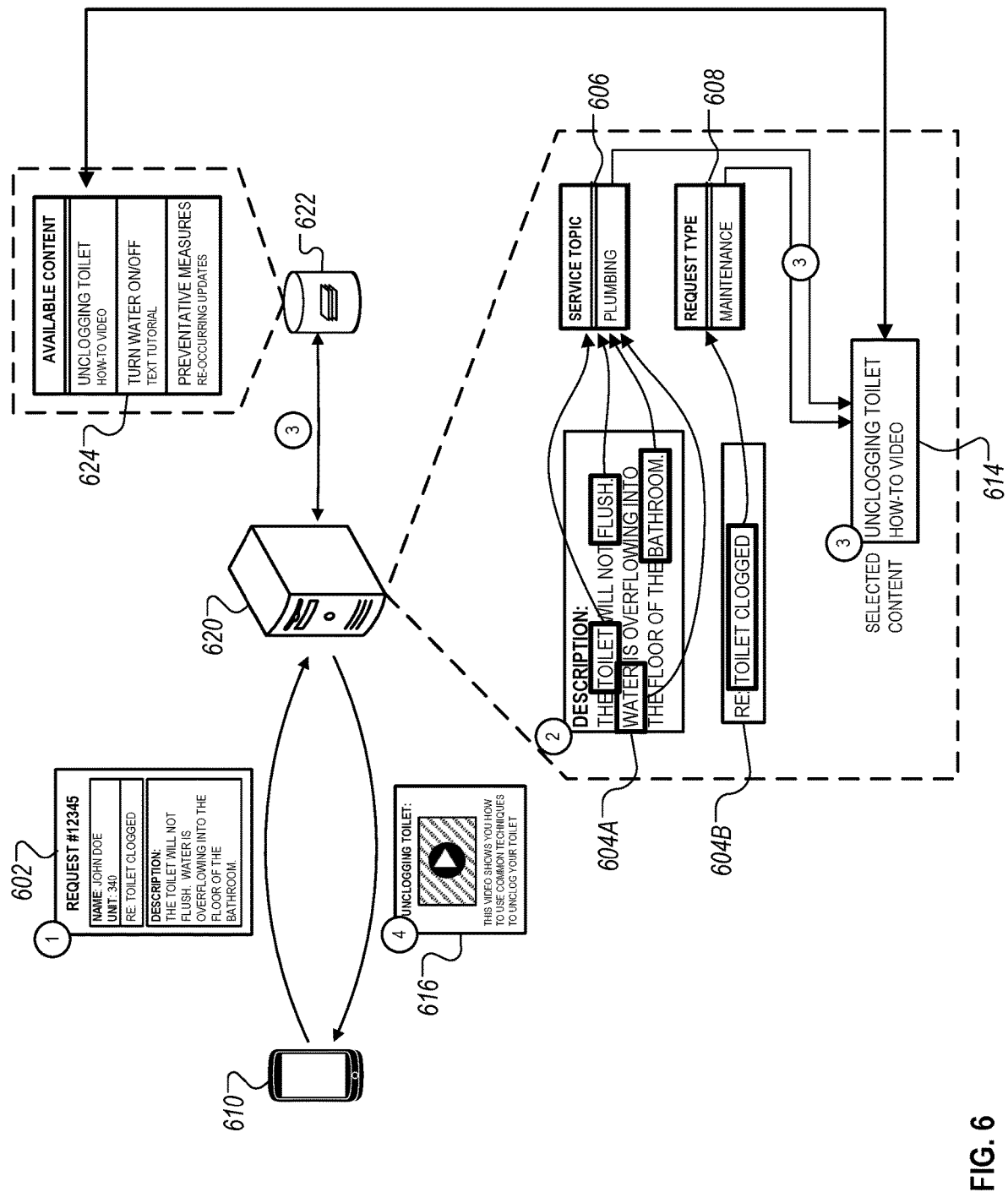
FIG. 6 illustrates an example of a process for transmitting automated content for a service request received from a device of a resident.

FIG. 6 illustrates an example of a system 600 that is capable of automatically transmitting content in response to receiving a service request from a resident. In the example depicted, the content provided by the system 600 relates to the example depicted in FIG. 4 And discussed above. In other examples, the system 600 can be capable of transmitting content for other scenarios, such as the example depicted in FIG. 5.

In general, the example depicted in FIG. 6 illustrates the techniques that can be used by the system 600 to automatically provide content to a resident that submits a service request. In this context, "automatic" refers to techniques that can be performed with minimal or no input by a user. For example, the techniques illustrated in FIG. 6 can be performed by the system 600 without requiring input from a property administrator. In this regard, the system 600 is capable of automating the service request response protocol used by a property administrator (or a property management company) during times when a service request is received, for example, in the middle of the night, during weekends, or other times when management or maintenance personnel may be unavailable.

The system 600 includes a computing device 610 and a server system 620 that exchange communications over a network such as the network 105. The server system 620 access a content repository 622, which stores a collection of content 624. In some implementations, the components of the system 600 can correspond to components of the system 100 depicted in FIG. 1. For example, the computing device 610 can represent one of the resident devices 130, and the server system 620 be one of the property management system 120 or the application server 110. In such implementations, the components of the system 100 discussed above are capable of performing the operations discussed below in reference to FIG. 6.

The collection of content 624 can include content that is predetermined to be associated with one or more properties being monitored by the server system 610. In some implementations, the collection 624 includes content that is predetermined to be associated with the property in which the client device 610 is located. In such implementations, customized content can be included in the collection 624 based on service requests previously received at the property. For example, collection can include a greater portion of content related to kitchen maintenance if, for instance, sixty percent of service requests submitted by tenants of the property relate to kitchen appliances.

In other implementations, the collection 624 includes content that is predetermined to be associated with multiple properties. In such implementations, content can be customized within the collection 624 based on property attributes. For example, the collection 624 can include content that is predetermined to be associated with properties that are located within a particular geographic location, e.g., a municipality, a city, a state, etc. In another example, the collection 624 can include content that is predetermined to be associated with a specify property type, e.g., an apartment building, a single family house, a multi-family house, etc. In such implementations, the system 600 can use a variety of clustering techniques to classify and index content within the collection 624 according to a set of known property attributes, e.g., rental/listing price, total occupancy, property age, number of renovations performed, etc.

The content included within the collection 624 can include various types of content. The content can be of different formats, e.g., videos, text, audio, etc., as well as different types of topics. In some implementations, the stored content can be further classified between, for example, preventative content, e.g., content that assists residents before property maintenance is needed, and restorative content, e.g., content that assists a resident to perform maintenance. The content can also associated with different service and/or service topics. The topics can be specified by the appliance corresponding to the content such as refrigerator thermostat, electrical panel, cabinet knob, etc. Alternatively, topics can additionally, or alternatively, be specified by category of maintenance to be performed, e.g., carpentry, cleaning, common, electrical, exterior, extermination, HVAC, etc. In some implementations, the collection 624 can include multiple classifications and sub-classifications that are used by the system 600 to automatically identify content that is relevant to a received service request as discussed below.

The server system 620 can be any type of server that is capable of receiving a service request, processing the contents of the service request, identifying content that is responsive or otherwise relevant to the received service request, and transmitting the identified content to the client device 610. In some implementations, the server system 620 is a computing device that is used by a property administrator (or a property management company) to manage incoming service requests submitted by users. In such implementations, the server system 620 can run dedicated PMS that catalogs incoming service requests associated with one or multiple properties. In some instances of these implementations, the PMS can be adjusted to include modules, plug-ins, or other software-based capabilities to performed the techniques discussed throughout. For example, a commercial off-the-shelf (COTS) PMS can be adjusted and/or customized to include a plug-in that enables the PMS to monitor incoming service requests, access and/or filter the content repository 622 to select stored content, and transmit the selected content to the client device 610. In this example, the plug-in may be capable of importing data stored within the PMS, e.g., contact information for residents, cataloged service requests, etc. to configure and/or adjust the performance of operations discussed throughout.

Alternatively, in other implementations, the server system 620 is a dedicated web server that provides a property administrator with access to, for example, a web-based portal on which he/she can perform different property management operations. In these implementations, the techniques depicted in FIG. 6 can be performed by both computing devices that does not run a dedicated PMS for managing one or more properties. A property administrator, in such implementations, can use the web-based portal to upload content to be stored within the content repository 622, add and/or edit contact information for residents of a managed property, setup reporting and/or response options for received service requests, among others.

Referring now to the example depicted in FIG. 6, the automated content transmission technique proceeds according to the following steps. At step (1), the resident of a property uses the computing device 610 to transmit a service request 602. As discussed above with respect to FIG. 5, the service request 602 identifies a reported issue with a resident's toilet not properly flushing. The service request 602 includes text fields that include text input provided by the resident through the client device 610 when submitting the request.

At step (2), the server system 620 processes the contents of the service request 602, such as text fields 604A and 604B. As discussed above, the server system 620 can use a combination of natural language processing, optical character recognition, semantic analysis, image recognition and/or classification, among others, to determine identifying attributes of the service request 602.

In the example depicted in FIG. 6, the server system 620 identifies a service topic 606 and a request type 608 for the service request 602 based on processing the text fields 604A and 604B. In this example, the server system 620 determines that service topic is "PLUMBING" based on the occurrence of terms such as "TOILET," "FLUSH," "WATER," and "BATHROOM" within the text field 604A. The server system 620 also determines that the request type is "MAINTENANCE" based on the occurrence of the phrase "TOI- LET CLOGGED" within the text field 604B. These determinations can be based automatically based on using, for example, a term association dictionary that maps a set of specified terms with designated service topics and request types. In other implementations, such determinations can be based on selections made by the resident when submitting the service request. In some other implementations, the determinations can be made to verify that the resident has correctly identified the service topic and/or the request type of the service request 602.

At step (3), the server system 620 uses the service topic 606 and request type 608 to select content 614 from among the collection 624 stored within the content repository 622. For example, the server system 620 can use the service topic 606 and the request type 608 as indexes to filter the content repository 622 to identify a collection of relevant content. In some implementations, the server system 620 may use other external data to select the content 614. The server system 620 may use user preferences associated with the resident that was submitted during a registration process to select from among multiple pieces of relevant content. As an example, if the server system 620 identifies analogous content in different formats, e.g., text, video, audio, the server system 620 can select from among the analogous content based on determining the appropriate format that is most likely to assist the resident. To illustrate, if the resident is an elderly individual, the server system 620 may select video content that is more instructive to the resident. Alternatively, if the resident is a younger individual, the server system 620 may select textual content.

At step (4), the server system 620 provides a communication 616 that includes the selected content 614 for output to the computing device 610. The server system 620 can provide the communication can be provided in different formats. Examples of communications can include a text message, an email, an application notification, an operating system notification, an automated telephone call, among others. In some implementations, the type of communication provided to the computing device 610 can be based on the type of content to be provided to the computing device 610. For example, a telephone call can be provided to the computing device 610 if the selected content is an audio file. In another example, an email can be provided to the computing device 610 if the selected content is text of an article, or a uniform resource link (URL) hyperlink to a video that is access on the Internet.

The server system 620 can generate the communication based on various factors and settings. In some implementations, the communication is generated based a device type of the computing device 610. For example, if the service request 602 is received from a mobile device, the communication may be a text message sent to a telephone number of the mobile device. As another example, if the service request 602 is received from a laptop computing device and/or a desktop computing device, the communication may be an email. In other implementations, the communication, notification and/or reporting settings of the PMS, the property administrator, and/or the resident of the computing device 610. For example, if the PMS of the property administrator is configured to provide certain types of reports and/or notifications to resident devices, the server system 620 can generate the communication in accordance with the settings of the PMS. In another example, if the resident has indicated a preference for a certain type of communication, e.g., text-based notifications, then the server system 620 generates the communication to accommodate the user preference.

Although FIG. 6 illustrates the transmission of content to the computing device 620 in response to receiving the service request 602, in some implementations, the server system 620 can proactively transmit content independently of receiving the service request 602. For example, as discussed above, the server system 620 can periodically transmit content for preventative maintenance in order to help residents understand actions that can be performed to prevent device malfunctions within the property.

Figure 7:
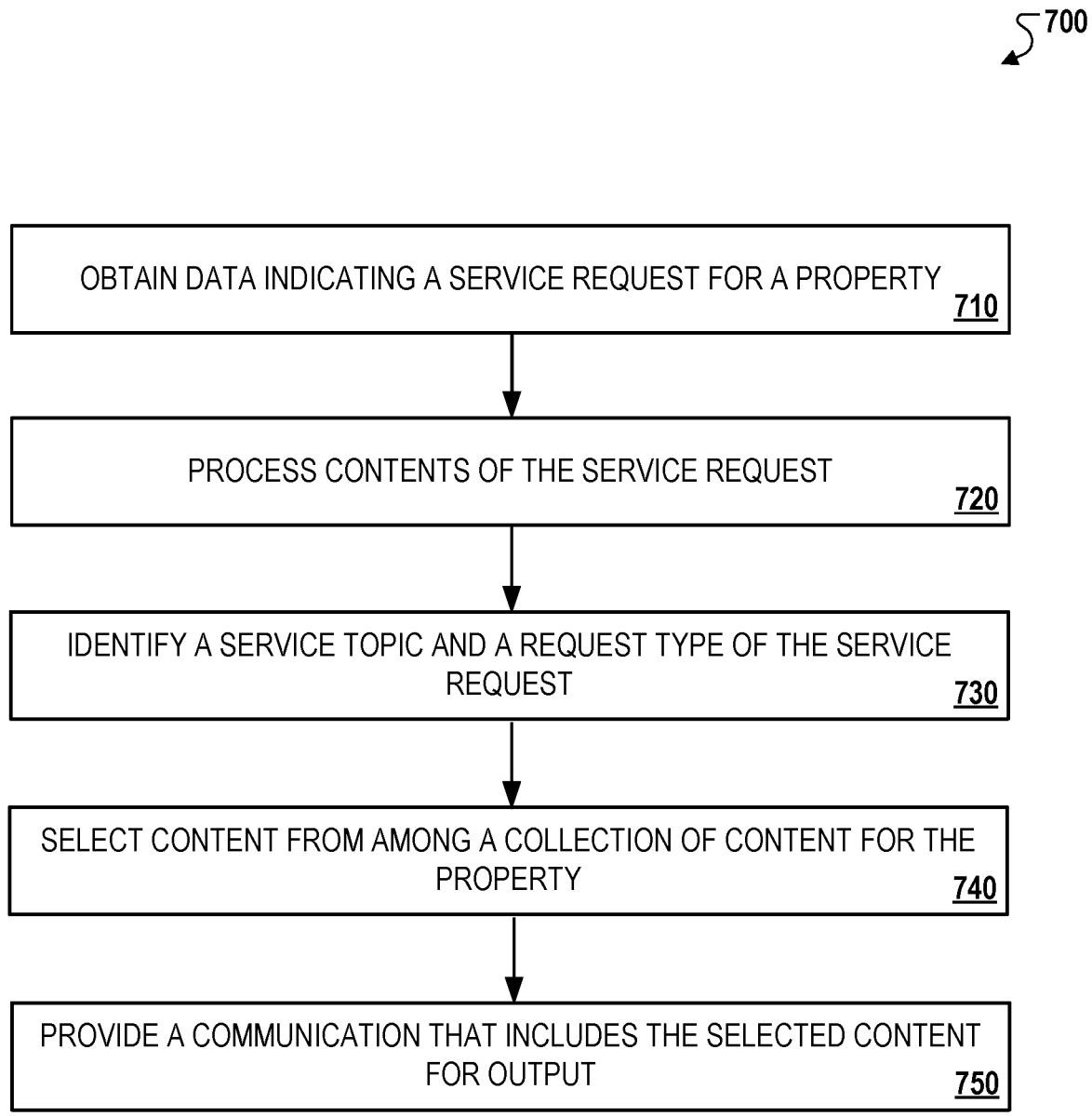
FIG. 7 illustrates an example of a process for transmitting automated content.

FIG. 7 illustrates an example of a process 700 for transmitting automated content. The process 700 can include the operations of obtaining data indicating a service request for a property (710), processing contents of the service request (720), identifying a service topic and a request type of the service request (730), selecting content from among a collection of content for the property (740), and providing a communication that includes the selected content for output (750).

In general, the process 700 is described in reference to system 600, although other systems, such as the system 100, can be configured to perform the process 700. In one example, the process 700 can be performed in response to receiving the service request 602. In another example, the process 700 can be performed independently of receiving a service request.

In detail, the process 700 can include the operation of obtaining data indicating a service request for a property (710). For example, the server system 620 may obtain data indicating the service request 602. The service request 602 can be submitting by the computing device 610 of a user such as a resident of a property. The service request 602 can identify a property associated with the computing device 602. The service request 602 can also include text fields that identify one or more issued being experienced by the user.

The process 700 include the operation of processing contents of the service request (720). For example, the server system 620 can process the contents of the service request 602. As depicted above, the server system 620 can use a combination of techniques such as natural language processing, optical character recognition, image recognition, image classification, semantic analysis, among others.

The process 700 include the operation of identifying a service topic and a request type of the service request (730). For example, the server system 620 can identify the service topic 606 indicated by the service request 602 and the request type 608 of the service request 606. The service topic 606 and the request type 608 can be identified based on processing the contents of the service request 602. For instance, as depicted in FIG. 6, the server system 620 can identify the service topic 606 based on identifying the occurrence of terms included within the text field 604A. The server system 620 can identify the request type 608 based on identifying the occurrence of terms included within the text field 604B.

The process 700 include the operation of selecting content from among a collection of content for the property (740). For example, the server system 620 can select content from among the collection of content 624 for the property. The selection can be based on the identified service topic 606 and the identified request type 608. As discussed above, the selected content 614 can include different file formats and can be customized based on the property, the resident, or both.

The process 700 include the operation of providing a communication that includes the selected content for output (750). For example, the server system 620 provides the communication 616 that includes the selected content 614 for output to the computing device 610. In some implementations, the communication 616 is a text message that is provided to the computing device 610 and includes the selected content 614. In such implementations, the text message can include a hyperlink to a web location of the selected content 614.

In some implementations, the service request 602 indicates maintenance for a particular appliance located within the property. In such implementations, the content includes a tutorial video for performing the maintenance on the particular appliance. For example, as depicted in the example shown in FIG. 6, the service request 602 indicates maintenance for a toilet, and the selected content 614 include a tutorial video for unclogging the toilet.

In some implementations, the collection of content 624 from which content is selected from includes content that is predetermined to be associated with service requests previously received for the property. As discussed above, the collection 624 can include content based on the most frequently received service requests. For example, if a majority of service requests for the property relate to electrical maintenance, then the collection of content 624 can be configured to include a greater portion of content that is associated with electrical maintenance. In other implementations, the collection of content 624 includes content that is predetermine to be associated with other properties that are classified as being the property type of the property of the service request 602.

In some implementations, the service request 602 is received by the server system 620 through PMS used by a property administrator (or a property management company). In such implementations, the PMS can run on an associated server system, or alternatively, on a computing device that run the PMS. The selected content 614 can then be selected from among the collection 624 that is stored within the PMS.

Figure 8:
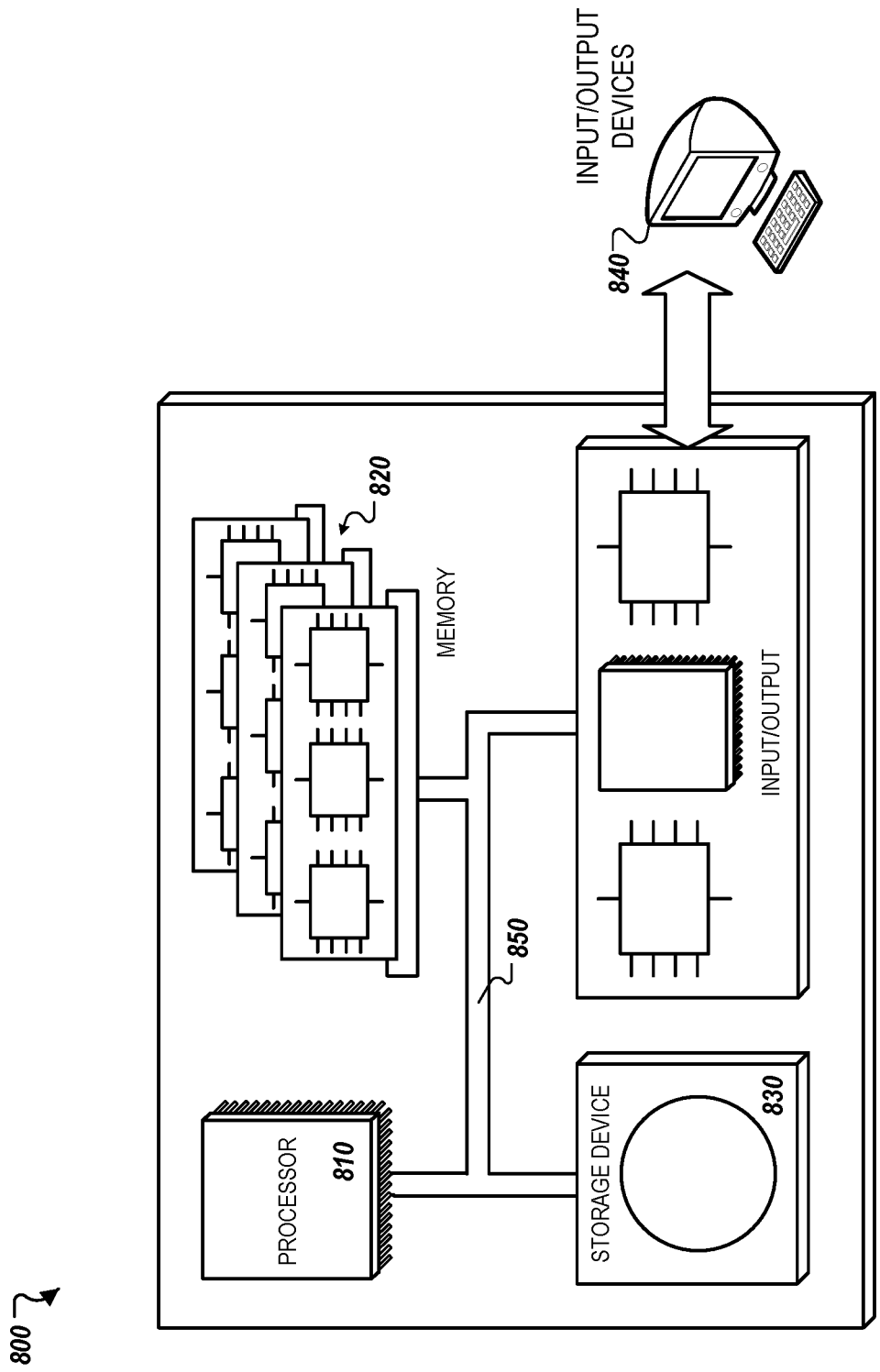
FIG. 8 is a block diagram of computing devices on which the processes described herein, or portions thereof, may be implemented.

FIG. 8 illustrates a schematic diagram of a computer system 800 that can be applied to any of the computer-implemented methods and other techniques described herein. The system 800 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 800) and their structural equivalents, or in combinations of one or more of them. The system 800 is intended to include various forms of digital computers, such as laptops, desktops, workstations, personal digital assistants, servers, blade servers, mainframes, and other appropriate computers, including vehicles installed on base units or pod units of modular vehicles. The system 800 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that can be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor can be designed using any of a number of architectures. For example, the processor 810 can be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method comprising:
   obtaining, by a server system, maintenance history data indicating prior maintenance operations performed at a property, wherein the maintenance history data specifies, for each of the prior maintenance operations, a respective service topic and a respective request type;
   generating, by the server system, a model configured to apply one or more natural language processing techniques to predict, from among the service topics and the request types specified by the maintenance history data, likely service topics and likely request types for future service requests to be associated with the property;
   obtaining, by the server system, a service request from a computing device associated with the property, wherein the service request is obtained during a time when maintenance personnel is not available to respond to the service request;
   using, by the server system, the model to identify a service topic and a request type likely to be associated with the service request;
   selecting, by the server system and from among a collection of electronic content, a subset of electronic content corresponding to the service topic and request type likely to be associated with the service request, wherein:
      the collection of electronic content includes (i) multiple formats of electronic content associated with prior maintenance operations performed at the property, and
      each electronic content is indexed in the collection of electronic content as being assigned to one or more service topics associated with the prior maintenance operations and one or more request types for the requests submitted with the prior maintenance operations;
   providing, by the server system and for output to the computing device, a communication that, when received by the computing device, causes the computing device to display the subset of electronic content; and
   updating, by the server system, the maintenance history data to include the service topic and the request type likely to be associated with the service request.

2. The method of claim 1, wherein:
   the service request indicates maintenance for a particular appliance located within the property; and
   the subset of electronic content comprises a tutorial video for performing the maintenance on the particular appliance.

3. The method of claim 1, wherein:
   the collection of electronic content comprises content that is predetermined to be associated with service requests previously received for one or more properties of a same property type as the property.

4. The method of claim 1, wherein applying the trained linguistic model to identify the service topic and the request type likely to be associated with the service request comprises:
   identifying a set of terms included within the service request;
   determining that the set of terms includes one or more terms corresponding to a particular service topic; and
   determining that the set of terms includes one or terms that identify a particular request type.

5. The method of claim 4, wherein:
   the one or more terms corresponding to the particular service topic identify a particular appliance within the property; and
   the one or more terms identifying the particular request type identify a type of maintenance to be performed on the particular appliance.

6. The method of claim 1, wherein:
   the service request is received by the server system through property management software; and
   the subset of electronic content is selected from among a collection of content stored within the property management software.

7. The method of claim 6, wherein:
   the communication comprises a text message provided to the computing device; and
   the text message includes a hyperlink to a web location of the subset of electronic content.

8. The method of claim 1, wherein:
   the collection of electronic content is stored in a content database associated with the server system; and
   the content database is periodically updated to include electronic content that is identified as corresponding to service requests processed by the server system.

9. The method of claim 8, wherein the content database stores electronic content that is classified and indexed within the collection of electronic content according to a set of property attributes.

10. The method of claim 9, wherein the set of property attributes comprises at least one of a total occupancy of a property, an age associated with the property, or a rental or listing prices of the property.

11. A system comprising:
    one or more computers; and one or more storage devices storing instructions that, when executed by the one or more computers, cause the one or more computers to perform operations comprising:
  obtaining, by a server system, maintenance history data indicating prior maintenance operations performed at a property, wherein the maintenance history data specifies, for each of the prior maintenance operations, a respective service topic and a respective request type;
  generating, by the server system, a model configured to apply one or more natural language processing techniques to predict, from among the service topics and the request types specified by the maintenance history data, likely service topics and likely request types for future service requests to be associated with the property;
  obtaining, by the server system, a service request from a computing device associated with the property, wherein the service request is obtained during a time when maintenance personnel is not available to respond to the service request;
  using, by the server system, the model to identify a service topic and a request type likely to be associated with the service request;
  selecting, by the server system and from among a collection of electronic content, a subset of electronic content corresponding to the service topic and request type likely to be associated with the service request, wherein:
    the collection of electronic content includes (i) multiple formats of electronic content associated with prior maintenance operations performed at the property, and
    each electronic content is indexed in the collection of electronic content as being assigned to one or more service topics associated with the prior maintenance operations and one or more request types for the requests submitted with the prior maintenance operations;
  providing, by the server system and for output to the computing device, a communication that, when received by the computing device, causes the computing device to display the subset of electronic content; and
  updating, by the server system, the maintenance history data to include the service topic and the request type likely to be associated with the service request.

12. The system of claim 11, wherein:
the service request indicates maintenance for a particular appliance located within the property; and
the subset of electronic content comprises a tutorial video for performing the maintenance on the particular appliance.

13. The system of claim 11, wherein:
the collection of electronic content comprises content that is predetermined to be associated with service requests previously received for one or more properties of a same property type as the property.

14. The system of claim 11, wherein applying the trained linguistic model to identify the service topic and the request type likely to be associated with the service request comprises:
  identifying a set of terms included within the service request;
  determining that the set of terms includes one or more terms corresponding to a particular service topic; and
  determining that the set of terms includes one or terms that identify a particular request type.

15. A non-transitory computer-readable storage device encoded with computer program instructions that, when executed by one or more computers, cause the one or more computers to perform operations comprising:
  obtaining, by a server system, maintenance history data indicating prior maintenance operations performed at a property, wherein the maintenance history data specifies, for each of the prior maintenance operations, a respective service topic and a respective request type;
  generating, by the server system, a model configured to apply one or more natural language processing techniques to predict, from among the service topics and the request types specified by the maintenance history data, likely service topics and likely request types for future service requests to be associated with the property;
  obtaining, by the server system, a service request from a computing device associated with the property, wherein the service request is obtained during a time when maintenance personnel is not available to respond to the service request;
  using, by the server system, the model to identify a service topic and a request type likely to be associated with the service request;
  selecting, by the server system and from among a collection of electronic content, a subset of electronic content corresponding to the service topic and request type likely to be associated with the service request, wherein:
    the collection of electronic content includes (i) multiple formats of electronic content associated with prior maintenance operations performed at the property, and
    each electronic content is indexed in the collection of electronic content as being assigned to one or more service topics associated with the prior maintenance operations and one or more request types for the requests submitted with the prior maintenance operations;
  providing, by the server system and for output to the computing device, a communication that, when received by the computing device, causes the computing device to display the subset of electronic content; and
  updating, by the server system, the maintenance history data to include the service topic and the request type likely to be associated with the service request.

16. The device of claim 15, wherein:
the service request indicates maintenance for a particular appliance located within the property; and
the subset of electronic content comprises a tutorial video for performing the maintenance on the particular appliance.

17. The device of claim 15, wherein:
the collection of electronic content comprises content that is predetermined to be associated with service requests previously received for one or more properties of a same property type as the property.

18. The device of claim 15, wherein applying the trained linguistic model to identify the service topic and the request type likely to be associated with the service request comprises:
  identifying a set of terms included within the service request;
  determining that the set of terms includes one or more terms corresponding to a particular service topic; and determining that the set of terms includes one or terms that identify a particular request type.

19. The device of claim 18, wherein:

the one or more terms corresponding to the particular service topic identify a particular appliance within the property; and the one or more terms identifying the particular request type identify a type of maintenance to be performed on the particular appliance.

\* \* \* \* \*

UNITED STATES PATENT AND TRADEMARK OFFICE
CERTIFICATE OF CORRECTION

PATENT NO. : 11,042,950 B2
APPLICATION NO. : 15/696236
DATED : June 22, 2021
INVENTOR(S) : Bradley Moser Vaughn and William J. Raduchel Page 1 of 1

It is certified that error appears in the above-identified patent and that said Letters Patent is hereby corrected as shown below:

In the Claims

Column 20, Claim 4, Line 31, after "or" insert -- more --;

Column 22, Claim 14, Line 1, after "or" insert -- more --; and

Column 23, Claim 18, Line 1, after "or" insert -- more --.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*